US012329192B2

(12) United States Patent
Partansky et al.

(10) Patent No.: US 12,329,192 B2
(45) **Date of Patent: *Jun. 17, 2025**

(54) AUTOMATED DEPOSITION OF HIGHLY VISCOUS FLUIDS INTO THIN-WALLED CYLINDERS

(71) Applicant: Sorting Robotics, Inc., Van Nuys, CA (US)

(72) Inventors: Nohtal Partansky, Northridge, CA (US); Paul Skaar, Long Beach, CA (US)

(73) Assignee: Sorting Robotics, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,302

(22) Filed: Feb. 19, 2024

(65) Prior Publication Data

US 2025/0017258 A1 Jan. 16, 2025

Related U.S. Application Data

(63) Continuation of application No. 18/111,769, filed on Feb. 20, 2023, now Pat. No. 11,903,409, which is a continuation of application No. 17/180,697, filed on Feb. 19, 2021, now Pat. No. 11,800,890.

(60) Provisional application No. 62/984,093, filed on Mar. 2, 2020.

(51) Int. Cl.

| | |
|---|---|
| ***A24C 5/60*** | (2006.01) |
| ***A24B 15/28*** | (2006.01) |
| ***B67D 3/00*** | (2006.01) |

(52) U.S. Cl.

CPC .............. *A24C 5/608* (2013.01); *A24B 15/28* (2013.01); *B67D 3/0022* (2013.01)

(58) Field of Classification Search

CPC ........ A24C 5/608; A24B 15/28; B67D 3/0022

USPC .................................... 141/52, 83, 144, 145

See application file for complete search history.

(56) References Cited

U.S. PATENT DOCUMENTS

| | | | |
|---|---|---|---|
| 4,226,266 A | 10/1980 | Guigan | |
| 4,409,995 A | 10/1983 | Nichols | |
| 4,711,851 A * | 12/1987 | McNamara | C12M 41/12 422/63 |
| 5,199,604 A | 4/1993 | Palmer et al. | |
| 5,316,730 A | 5/1994 | Blake et al. | |
| 5,387,285 A | 2/1995 | Rivers | |
| 6,186,192 B1 | 2/2001 | Orme-Marmarelis et al. | |
| 6,237,650 B1 | 5/2001 | Ansaloni | |
| 7,367,170 B2 | 5/2008 | Hafker et al. | |

(Continued)

*Primary Examiner* — Timothy L Maust

(74) *Attorney, Agent, or Firm* — Cognition IP, P.C.; Edward Steakley; Justin White

(57) ABSTRACT

Disclosed are systems and methods for automatic infusion of concentrate and distillate material into cigarettes or other containers. In one embodiment, a thermally-controlled infusion system is provided. The system can maintain a selected temperature of the concentrate material throughout the infusion process, using a two-stage approach. In a first stage, the concentrate material is pressure-fed to a dosing chamber. In the second stage, the concentrate material is pumped into an insertion canula and into a cigarette or container. A revolver houses the cigarettes or containers and vertically transitions them to an insertion position, where the insertion canula can infuse the cigarettes or containers.

18 Claims, 10 Drawing Sheets

(56) References Cited

U.S. PATENT DOCUMENTS

| | | | | |
|---|---|---|---|---|
| 8,158,059 | B2 | 4/2012 | Kennedy et al. | |
| 8,272,537 | B2 | 9/2012 | Varga | |
| 8,734,406 | B2 | 5/2014 | Cressman | |
| 8,903,673 | B2 | 12/2014 | Brinker et al. | |
| 11,800,890 | B2 * | 10/2023 | Partansky | A24C 5/608 |
| 11,903,409 | B2 * | 2/2024 | Partansky | A24C 5/608 |
| 2010/0282361 | A1 | 11/2010 | Peters | |
| 2012/0241045 | A1 | 9/2012 | Aouad | |
| 2016/0009541 | A1 | 1/2016 | Orita | |

* cited by examiner

AUTOMATED DEPOSITION OF HIGHLY VISCOUS FLUIDS INTO THIN-WALLED CYLINDERS

CROSS-REFERENCE TO RELATED APPLICATIONS

This application is a continuation of U.S. application Ser. No. 18/111,769, filed on Feb. 20, 2023, which is a continuation of U.S. application Ser. No. 17/180,697, filed on Feb. 19, 2021, which claims the benefit of priority of U.S. Provisional Application No. 62/984,093, filed on Mar. 2, 2020, which are hereby incorporated by reference in their entirety and should be considered a part of this specification.

FIELD

This application relates to the field of temperature- and pressure-controlled injection of viscous fluids into containers and products such as cigarettes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Fluids which resist deformation are said to have high viscosity, while fluids which do not resist deformation are said to have low viscosity.

Fluids with low viscosity are thus easier to transfer than fluids with relatively higher viscosity as transferring a fluid from one location to another requires deforming the fluid through some conveyance apparatus, such as a tube, pipe, channel, etc., particularly in a controlled and contained manner.

The viscosity of a fluid at a prescribed temperature and pressure is a function primarily of the molecular properties of the fluid. Thus, to change the viscosity of a given fluid, where the molecular properties of the fluid may not be altered, the temperature of the fluid must instead be altered.

For a majority of liquids, an increase in temperature will decrease viscosity. Thus, in order to decrease the resistance of a liquid to deformation to allow the liquid to be more readily transferrable, the temperature of the liquid must generally be increased.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

DETAILED DESCRIPTION

Figure 1:
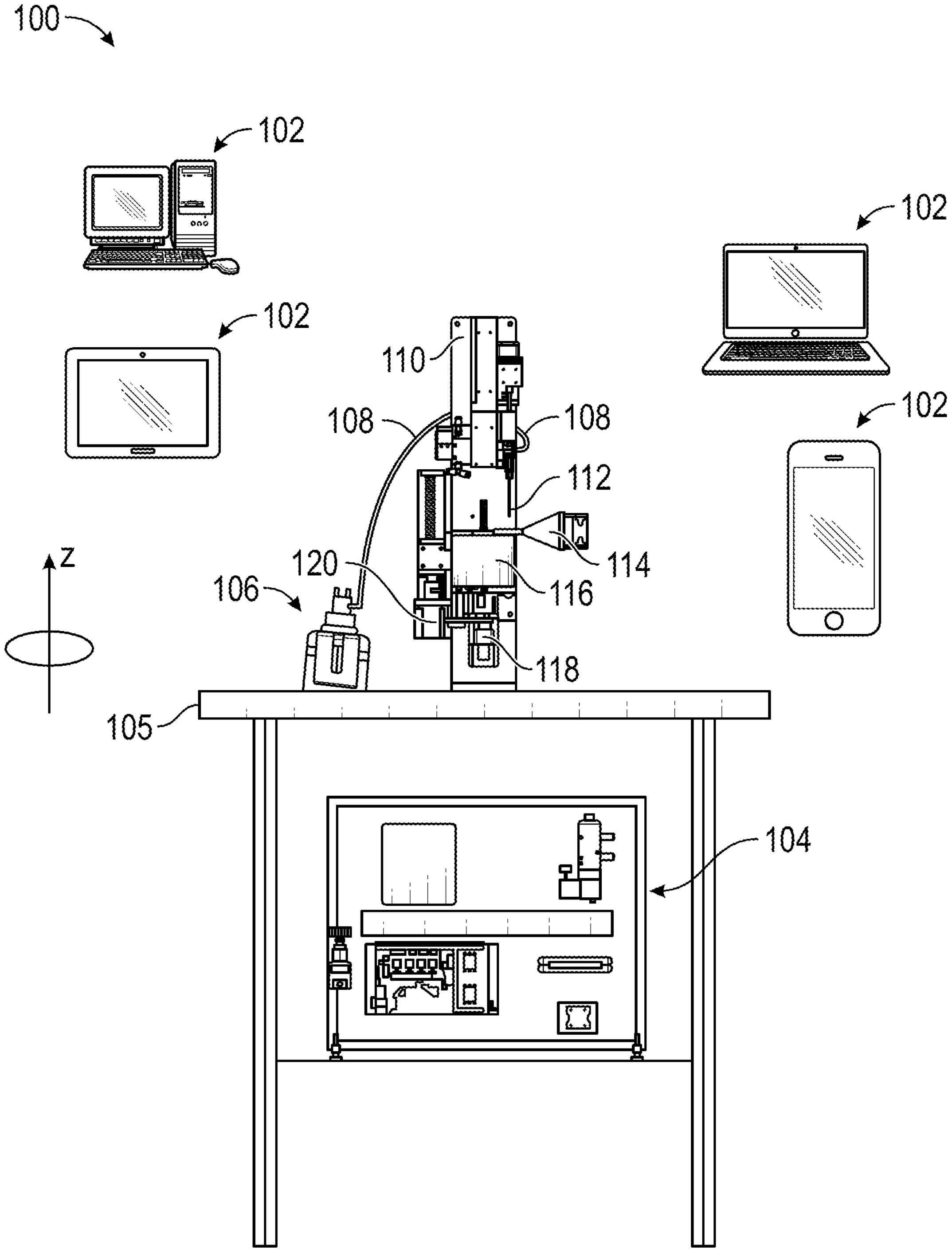
FIG. 1 illustrates a thermally-controlled concentrate infusion system according to an embodiment.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Consistent fluid temperature across an entire system is challenging to achieve in standard room temperature environments, however. Not only must the initial reservoir or container holding the fluid be heated to get the high viscosity fluid moveable, the conveyance apparatus and destination reservoir or final applicator must also be heated to the same or similar temperature as the previous components to ensure the fluid remains moving, or capable of moving depending on the state of the system during the intended operation. Thus, the entire system must remain at a stable temperature for reliable and consistent performance.

Failure to uniformly heat the entire system, or at the very least control the temperature of the entire system, may result in inconsistent transference arising from elevated or unexpected viscosity variance throughout the system due directly to temperature variance, particularly in colder areas called "cold spots" where the viscosity is higher than desired.

Further, overheating which creates warmer than intended portions of the system, called "hot spots," may alter the material properties of the fluid and potentially damage, diminish, or otherwise irrevocably, unintentionally, and undesirably alter certain characteristics, whether flavor, taste, look, smell, shelf life, quality, composition, or other property of the fluid which is either intended or not intended to exist in the finished product, depending on the particular product and property in question.

It is thus a requirement to ensure a steady operational temperature, specific to the fluid and chosen application, throughout the system.

The purpose of the system is to handle and transfer combinations, solutions, mixes, blends, or otherwise coalesced materials in some manner, which have any viscosity, low or high, at room temperature from the single system. Examples of fluids of particular applicability to the aforementioned system includes, but is not limited to, distillate, terpenes, oils, flavoring, coloring and any other fluid or combination of fluids, whether considered of "high" viscosity or not.

Given the variety of potential applications, the system must allow consistent filling, deposition, insertion, injection, ejection, discharge, or any form application of the fluid may take into various packaged goods, including, but not limited to, tanks, cartridges, caps, vials, jars, tubes, cylinder, bags, rolled from paper or industrial hemp or flax, among other raw or processed materials, packed with materials such as, but not limited to, tobacco or industrial hemp as defined in the Agricultural Act of 2014, P. L. 113-79, or any form a container may take which holds fluid or other materials hermetically, permeable, or otherwise.

The form of temperature control may come in various forms, including a heated block in which a syringe or other applicator attaches, holding the fluid to be transferred inside the barrel or like internal reservoir. A drive system, such as a lead screw and stepper motor with carriage, or belt and timing pulley system driven with stepper motors, or pneumatic or hydraulic actuator, or some other motion system, may act on the syringe plunger and drive the heated fluid held in the barrel through the tip directly through a needle, port, exhaust, or other applicator component, or through a conveyance apparatus to a second reservoir or holding area, or to a applicator component located in a different section of the system, and even to a return path allowing fluids to be cycled through the system, as with a cleaning flush in certain implementations.

The temperature control system may also be a heated and enclosed reservoir maintained at greater than atmospheric pressure with the fluid stored inside. The higher pressure inside the chamber would force the heated fluid to flow through any orifice of the chamber and in this way be transferred.

The form of applicator components, that is the exit point of the fluid whence the fluid flows into the desired container, or simply called applicators, described previously may be a single needle, cannula, tube, or other opening, whether ball point, blunted, sharp, single-port, multi-port, front or side ported, curved, straight, jagged, and of various cross-sectional designs, or flow control mechanism such as a valve, among other possible configurations including multiple applicators per receiving vessel.

The described system may also have interchangeable heads and end effectors to which the various applicator options are affixed, in various configurations, which would allow the system to be compatible with any variety of applicators and packages.

The applicators may also be comprised of any combination of these listed characteristics, and additionally may be any number or array of the individual or combined styles in a grid of m-by-n applicators, and with a third dimension as needed, evenly spaced or not, and otherwise patterned to create the desired interface characteristics, geometry, and behaviors with various products.

The applicators may also rest on a rotating or moving platform of two forms. In certain implementations, the product being filled moves into position and the applicator also moves to facilitate the filling action. In this way the applicator may interact with the object being filled but retract and remain out of the way as objects transition through the overall system in a series of stations as with an assembly line.

In other implementations, the applicator rests in a fixed position as the object being filled moves into position, both from the previous station, hopper, or holding area, and to avoid interacting with the applicator unintentionally during the described transition, as in a collision, jam, or other unintended way.

Regardless of the configuration, the system may also allow variable flow rates of the fluid exiting the applicator as well as the rate at which the applicator is inserted or removed from the packaging as the fluid is injected. In this way, the concentration of fluid may potentially vary inside the container, depending on the original contents of the container prior to the application of the fluid.

Further, the entire system, referred to as the primary system, may also be enclosed in a secondary temperature control system, chamber, or other means of enclosure. This secondary system would alter the perceived ambient temperature outside of the previously described primary temperature control system and work to diminish thermal losses experienced by the fluid moving inside the primary system.

Considering all of the above, there exists an opportunity to infuse, where infuse should be taken to mean any of the conveyance methods mentioned above, industrial hemp filled cigarettes, as in a cylinder containing herbs or other substances intended for consumption, with any of the various aforementioned fluids, but namely distillate and terpene formulations. This may be done by humans, but the repeatability of human operators is poor, and the consistency between infused products would be suspect leading to low quality. Humans are also poorly equipped to accurately and reliably control the flow of fluid from a cannula consistently.

Further, the need to control the fluid temperature would pose a challenging human-machine interface problem in the event the temperature is not comfortable for humans. Thus, an opportunity exists to automate this process and remove humans from the operation to achieve high standards of quality, reliability, and throughput, and similarly allow for easy transition between formulations.

In some implementations, the transfer of high viscosity fluids may be extremely challenging given certain fluid properties at room temperature which cause the fluid to resist movement. To facilitate this transfer, the fluid may be heated in a controlled manner as to ensure consistent temperature across the fluid, whether at the initial reservoir, in the conveyance apparatus, or through the final applicator into the package or container.

The described system may be used to insert various fluids having naturally high viscosity at room temperature into containers or packages of various shapes and sizes, either in single-fills or multiple-fill arrays of various configurations, whether circular, square, or otherwise.

In certain implementations, the fluid with high viscosity at room temperature may be a particular distillate, terpene, oil infusion which is injected via the described system into industrial hemp-packed cigarettes. The described system is capable of heating and injecting different formulae of varying viscosity into the aforementioned cigarettes with minimal reconfiguration required, including various swappable components and control logic to facilitate this general compatibility among other features.

Finally, automation is applied to facilitate the rapid and consistent production of finished, infused products. This automation comes in many forms and seeks to create a consistent product with minimal human involvement required for continued operation.

In certain implementations, a ceramic reservoir, or other insulated container, may be lined internally with a heating element. The heating element controls the temperature of the internal volume via a control loop feedback. In some embodiments, the heating element can be an integrated thermistor. Other or alternative heating mechanisms can also be used. The ceramic pot is sealed such that the internal volume may be pressurized above atmospheric pressure.

In the described implementation, a particular distillate, terpene, oil, or other additional substance, simply a formulation when all put together, is loaded into the ceramic pot in a container, typically in the form of a glass jar, such that, once loaded, the operator does not have to interact directly with the formulation in any way. The heating element lining the inside of the ceramic pot heats the internal volume which in turn raises the temperature of the formulation to a desirable level to achieve a required viscosity. In some embodiments, a stirrer can help the liquid have a more uniform temperature and/or viscosity.

In certain implementations, the described system may have a port or other orifice on the side of the container which would permit the heated formulation to exit the container in a controlled manner through a tube. This may be accomplished by pressurizing the inside of the container which presses on the formulation and, with greater pressure inside the container than outside, forces the formulation through the tube and towards the applicator.

As described above, once the fluid exits the container, the temperature of the fluid must also be controlled to ensure viscosity does not increase once the fluid is exposed to external temperatures. This may be achieved by heating a tube. For example, in some embodiments, the heating tube can be nichrome wire wrapped in Kapton tape at a specific coil density as to produce a particular resistance, which in turn generates heat. Alternative heating tubes can also be used as envisioned by persons of ordinary skill in the art.

In certain implementations, if this primary container and system were stored in a heated enclosure, the heat loss from the tube to the ambient environment would be minimized.

The heated tube may lead to a similarly heated aluminum block, to which a cannula is attached.

In certain implementations, the action of injecting, or infusing, formulation into the cigarette may be automated by a rotating revolver system which allows for multiple actions to be performed on multiple cigarettes at the same time, or on one cigarette at the same time, while the revolver rotates the injected and non-injected cigarettes from between positions relative to the cannula.

The rotating system also translates on a linear motion system to clear the infusion cannula and ejection rod as the revolver rotates cigarettes between the various described stations.

In some embodiments, there are two primary bodies which comprise the described system: (i) a base upon which the infusion cannula, insertion rod, and (ii) the revolver system. The base is unmoving and is affixed to the baseplate of the system. The revolver, as mentioned previously, may be mounted to a linear motion system which allows the revolver system to move in relation to the stage.

To start, the revolver platform rests at a distance from the base with cannula and various rods. As the revolver system translates towards the base, the revolver system approaches the base, the cannula enters the cigarette to begin infusion. Once the cannula is adequately buried in the industrial hemp within the cigarette, the fluid transfer system described herein begins to push formulation from the tip of the cannula into the cigarette. Simultaneously with the excretion of formulation into the cigarette, the revolver platform retracts from the base and moves away towards the initial or previous displacement between revolver and base.

The tip of the canula may be shaped to discourage hemp material from entering and clogging the cannula, and a single side port on the canula allows for the formulation to be deposited into the cigarette as the cannula is retracted using the linear motion of the revolver system. More than a single port through which the formulation is expelled may cause irregular distribution of formulation and compromise the quality of the deposition. The tip of canula further acts to push stem or other coarse constituents of industrial hemp aside as the cannula enters the cigarette, to avoid potentially impaling these products and causing any damage to the integrity of the cigarette.

In certain implementations, the flow rate of formulation coming out of the cannula remains constant as the speed of the revolver platform moving away from the base also remains fixed. In this way, the distribution of formulation along the length of the cigarette may be constant. In other implementations, this distribution of formulation along the cigarette length may vary to produce various desirable effects of experiences during consumption. The distribution of formulation need not be along the central axis, either, and may be displaced to one side, or many, in some symmetric pattern or otherwise in various implementations.

Once the revolver platform has retracted to a sufficient distance to no longer contact the cannula or ejection rod, a motor rotates the revolver, moving cigarettes between stations and thus beginning the cycle over. In this way, the infusion of industrial hemp cigarettes with distillate-terpene formulation may be automated. This retraction also removes any clinging particles or material from the cannula in the way of a wiper through which the cannula enters the revolver platform to keep the cannula clean.

Existing approaches to infusing cigarettes with distillates, oils, fluids or other concentrate material can be a messy and manual process. One existing technique includes dipping pre-rolled cigarettes in distillate material to coat the outside of the cigarettes with the distillate material. However, dipping the outside of a cigarette in this manner causes the added material to burn off during consumption, without much inhalation. Another approach includes, mixing the concentrate material with dried ice and crushing the mixture into powder form. The powder form is then mixed with a cigarette filling material, which is then rolled into a cigarette. One problem with this approach is that the mixture of the concentrate material and the cigarette filling material cannot be reliably determined and repeated, so the resulting product is inconsistent. Additionally, the mixture can be extremely sticky at room temperature. While existing automation systems may be able to handle some stickiness in the cigarette filling material, when that material is further mixed with sticky concentrate material, the automation may not be able to efficiently handle the resulting mixture. Consequently, there is a need for systems and methods that can reliably and repeatedly infuse cigarettes with concentrate material and provide consistent and controlled output.

FIG. 1 illustrates a thermally-controlled concentrate material infusion system 100 according to an embodiment. The system 100 can be controlled via a variety of computers 102, including for example, desktops, laptops, tablets, smart phones or other devices capable of wired or wireless communication. Some components of the system 100 can be mounted or otherwise placed on a table or stand 105. The computers 102 can be loaded or otherwise be configured with a software or programming application for managing the operations of the system 100. The computers 102 connect with mechanical-electrical interface board 104. The interface board 104 translates the electrical signals from the computers 102 or from one or more software programming applications to inputs executable by the electrical and/or mechanical components of the system 100.

The system 100 includes a thermally controlled and pressurized reservoir 106 of concentrate material. The reservoir 106 can maintain the concentrate material at a selected temperature and pressure. The reservoir 106 is connected via a heated tube 108 to a dosing chamber on the baseplate 110. The heating tube 108 can be selected of a length and wattage, such that the temperature of the concentrate material, as it traverses through the heated tube 108, is substantially maintained at a selected temperature. In some embodiments, the heated tube 108 is a sleeve heater with a nichrome wire spiraling around its volume. The reservoir 106 is connected to a pump or an air pressure line to provide a feed pressure inside the reservoir 106. The term feed is used to note the feed pressure causes the concentrate material to move from the reservoir 106 to other components of the system 100. The feed pressure inside the reservoir 106 can be an amount of selected pressure greater than the atmospheric pressure. The feed pressure inside the reservoir 106 can move the concentrate material through the heated tube 108 and into a dosing chamber.

The dosing chamber is connected to a needle assembly 112 on one end and to a pump assembly on the other end. The pump assembly can be configured to exert a dosing amount of pressure to the concentrate material in the dosing chamber to move the concentrate material to the needle assembly 112 and subsequently to a container or cigarette housed in a revolver.

A heater fan 114 can heat up a canula of the needle assembly 112 to reduce or minimize the loss of temperature of the concentrate material. The heater 114 can be positioned at a distance close (e.g., adjacent to the needle assembly 112) to provide heat to the needle assembly 112 in an amount to maintain the concentrate material temperature at a selected temperature. In some embodiments, multiple heaters 114 can also be used. Furthermore, the needle assembly 112 can be made of material selected to range between conductive and insulating to different degrees of insulation and conduction.

A revolver 116 can be a cylinder or carousel rotatable about an axis (Z) and can be shaped to include a plurality of cavities or hollowed cylinders into which cigarettes or other containers can be placed. While the axis Z is illustrated in the vertical position, axis Z is not necessarily limited to the vertical degree. Other angles of axis Z, such as horizontal, inclined, or slanted can also be used, without departing from the spirit of the disclosed technology. A first motor assembly 118 can move the revolver between a first and second position along the axis Z, where in the first or rotatable position, the canula of the needle assembly 112 is at a distance from the revolver 116, such that the canula does not penetrate the cavities of the revolver, and wherein the revolver 116 is free to rotate about the axis Z. In the second or insertion position, the first motor assembly 118 moves the revolver 116 toward the canula of the needle assembly 112, where the canula can penetrate a cigarette or other container housed in a cavity of the revolver 116. The axis Z can be defined as the axis along which the canula of the needle assembly 112 is positioned. In the insertion position, the canula of the needle assembly 112 is inserted into a cavity of the revolver 116, thereby preventing the revolver 116 from being able to rotate about the axis Z.

The system 100 can inject or start injecting the concentrate material into cigarettes placed in the cavities of the revolver 116 when the revolver 116 is in the insertion position. In some embodiments, a secondary motor assembly 120 can assist the first motor assembly 118 with moving the revolver 116 between the rotatable and insertion positions. Moving between the rotatable and insertion positions can include a linear move along the axis Z on which the revolver 116 is mounted or otherwise installed. The first motor assembly 118 can also rotate the revolver 116 about the axis Z, such that a new cigarette in a different cavity can be infused with the concentrate material. In an embodiment, the revolver 116 is moved to and from the canula of the needle assembly 112, wherein the cigarettes in the cavities of the revolver 116 are infused with the concentrate material injected from the canula of the needle assembly 112, one at a time, or multiples at a time (if multiple needle assemblies 112 are used). While one needle assembly 112 and revolver 116 are shown, the described embodiments are not so limited. Persons of ordinary skill in the art can envision using single and/or multiple instances of these components in various implementations of the system 100 to enable infusing multiple cigarettes at a time to increase the efficiency of the system 100.

At the insertion position, the revolver 116 moves toward the canula, such that the canula is inserted into a first cigarette and injects the first cigarette with the concentrate material. The revolver 116 then moves to the rotatable position, pulling away the already-infused first cigarette from the canula and positioning an uninfused second cigarette under the canula. The revolver 116 then moves up to the insertion position along the axis Z, whereby the canula penetrates and injects the second cigarette with the concentrate material. The process continues for the other cigarettes housed in the cavities of the revolver 116. In some embodiments, the revolver 116 can include 16 cavities or cylinders, housing 16 cigarettes. Persons of ordinary skill in the art can implement the revolver 116 with fewer or more cavities. For example, in one embodiment 20 cavities may be used.

Figure 2:
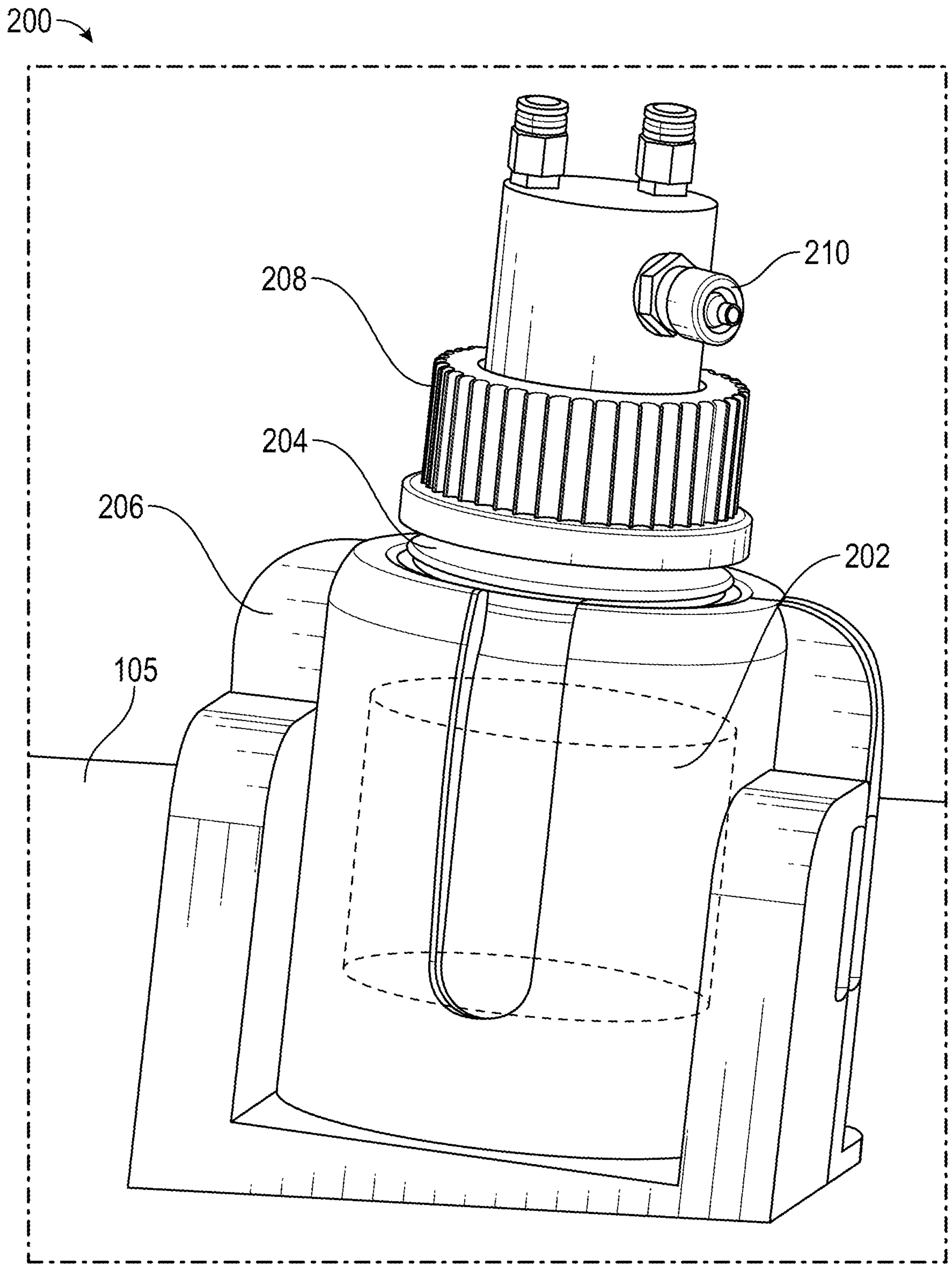
FIG. 2 illustrates a diagram of a thermally-controlled and pressurized reservoir according to an embodiment.

FIG. 2 illustrates a diagram of a thermally-controlled and pressurized reservoir 200 according to an embodiment. For example, the reservoir 106 of FIG. 1 can be implemented using the embodiment of the reservoir 200. A glass jar 202, which can house the concentrate material is encased in a silicone-molded heater 204. The silicone-molded heater 204 can include nichrome heater wires spiraling around its volume. The silicone-molded heater 204 can be mounted to the table 105 by a mount 206. The molding refers to molding the silicone heater 204 and the heating wires therein to encase the glass jar 202 in a heating mechanism. A reservoir lid assembly 208 can allow access to the glass jar 202. The lid assembly 208 can also include valves for pressurizing the inside volume of the glass jar 202 and the concentrate material. In some embodiments, the reservoir lid assembly 208 can also include a heater mechanism to help maintain a selected temperature of the concentrate material in the reservoir 200. An exit valve 210 can be connected to a heated tube 108 via which the concentrate material is moved from the glass jar 202 to the dosing chamber due to the positive pressure generated in the reservoir 200. In some embodiments, the various parts of the reservoir 200 are removably attached, mounted or otherwise put together, in order to allow for cleaning or changing the concentrate material. The described embodiment of the reservoir 200 is provided as an example. While the reservoirs 106, 200 are illustrated as mounted on a table/stand, not all embodiments are so limited. For example, in some embodiments, the reservoir can be positioned above a dosing chamber and pump assembly to use or obtain assistance of gravity to move the concentrate material from the reservoir to the dosing chamber.

In some embodiments, one or more thermocouples can be used inside and/or outside of the reservoir 106 to sense and communicate the temperatures of the concentrate material and/or its environment to the computers 102. The computers

102 can accordingly control the amount of temperature rise or fall to maintain a selected temperature of the concentrate material.

Figure 3:
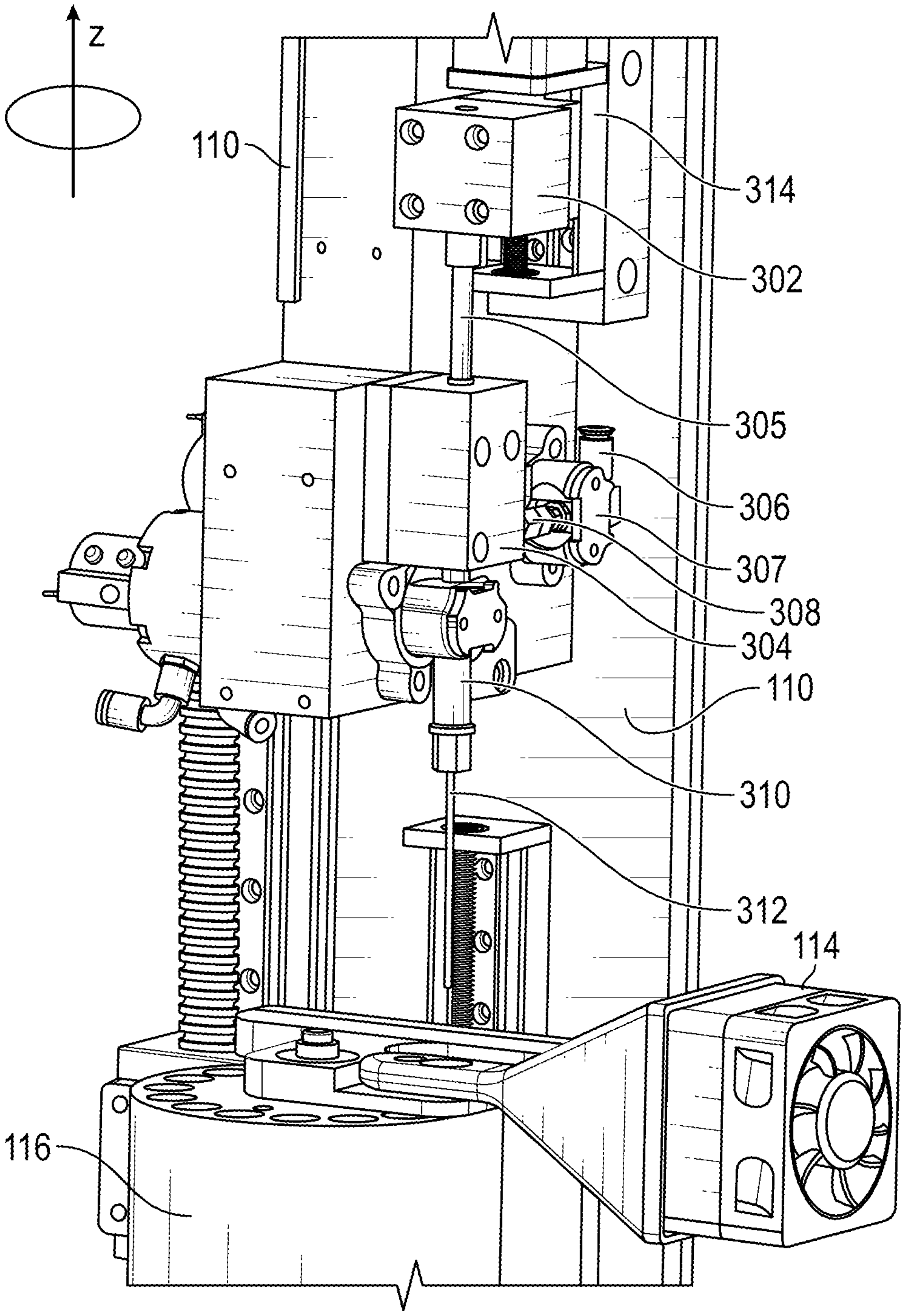
FIGS. 3 and 4 illustrate a revolver of the system of FIG. 1 in rotatable and insertion positions, respectively.
Figure 4:
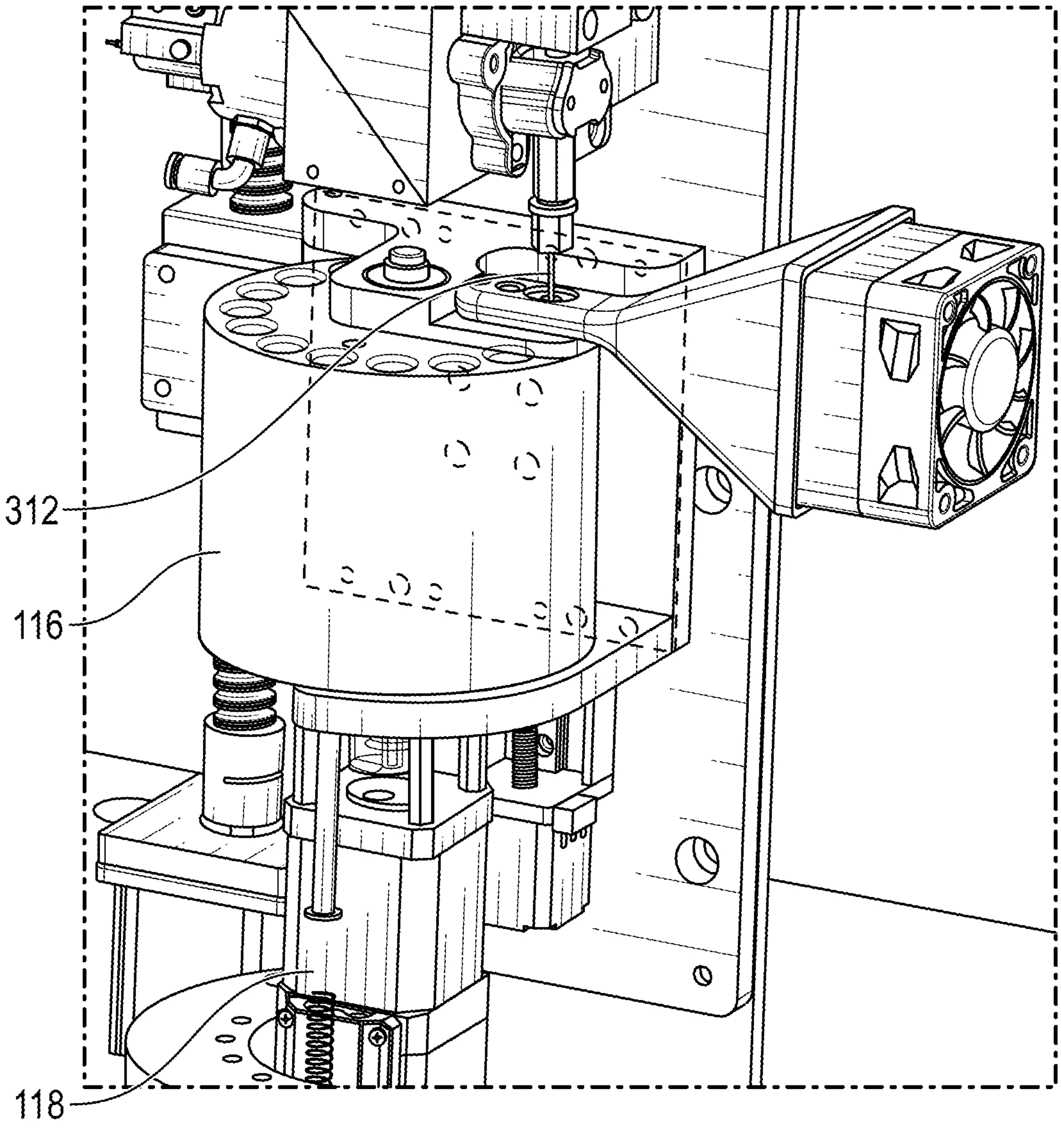

FIGS. 3 and 4 illustrate the revolver 116 in the rotatable and the insertion positions, respectively. In the rotatable position, the revolver 116 is at a distance from the canula 312 allowing for free rotation of the revolver 116 about the axis Z. In the insertion position, the revolver 116 is moved to a position, such that the canula 312 is inserted in a cylinder or cavity of the revolver 116 and the cigarette that is placed therein. In some embodiments, the needle assembly and the canula 312 are fixed on the baseplate 110. Thus, the insertion of the canula 312 to a cavity of the revolver 116 is due to the movement of the revolver 116 toward the canula along the axis Z. The insertion of the concentrate material via the canula 312 and into the cigarettes housed in the revolver 116 will further be described below. While the description of components and movement of the concentrate material are provided with reference to components shown in FIG. 3, the timing of the movement of the concentrate material is not necessarily limited to the positions of the components illustrated in FIG. 3 and can occur when the revolver 116 is in the rotatable position, in the insertion position, in between or at other times that allow for efficient dispensing of the concentrate material in relation to the positions of the canula 312, the revolver 116 and other components of the system 100.

The concentrate material is pushed to the dosing chamber 304 due to the feed pressure present in the reservoir 106. The dosing chamber 304 can act as a plenum for the concentrate material. In some embodiments, the concentrate material can be bled through the top of the dosing chamber 304 to reduce or minimize air that can cause filling quality problems. The dosing chamber 304 can be constructed of insulating material or can be encased in insulating material. The system 100 can include a pump assembly 302, 305, which can exert a dosing pressure to the concentrate material deposited in the dosing chamber 304. The pump assembly 302, 305 can include a plunger block 302 and a plunger rod 305. The plunger rod is inserted into the dosing chamber 304, and at the interface of the two, can include a neoprene surgical plunger tip. However, not every embodiment is so limited. The pump assembly 302, 305 and the dosing chamber 304 act as a syringe mechanism to provide a pump pressure stage and/or a shearing force to the concentrate material. The plunger block 302 moves along the axis Z, moving the plunger rod 305 into the dosing chamber 304, providing a dosing pressure to the concentrate material in the dosing chamber 304. The amount of movement of the plunger block 302, and the volume of the concentrate material it moves, can be calculated based on the mass of the concentrate material, which is selected to be infused in each cigarette. In other words, the amount (mass) of material dosed or infused into a cigarette is in the same ratio as the movement of the plunger block 302 along the axis Z. The amount and manner of dosed concentrate material can also be controlled in relation to the distance and speed of movement of the revolver 116 in the insertion position.

While not shown, the heated tube 108 is connected to the feed valve 306. The concentrate material is fed to the dosing chamber 304 via feed valves 306, 307 and 308. Fewer or more feed valves can be used depending on the implementation. One or more of the feed valves 306, 307 and 308 can be pneumatically powered valves, allowing for opening or shutting down the concentrate material feed into the dosing chamber 304. In one embodiment, the feed valves 306, 307 and 308 fill up the dosing chamber 304 to capacity. In some embodiments, one or more of the feed valves 306, 307, 308 shut off the flow of the concentrate material into the dosing chamber 304 before the plunger assembly 302, 305 exert the dosing pressure to the interior volume of the dosing chamber 304. When the revolver 116 is in the insertion position, such that the canula 312 is inserted into a cigarette, a dose valve 310 opens and the pump assembly 302, 305 can exert a dosing pressure to the concentrate material in the dosing chamber 304, injecting the concentrate material into the cigarette in the revolver 116, via canula 312 and in the same ratio as the movement of the plunger block 302. The plunger block 302 can be moved up and down via a slider actuator 314. The slider actuator can accept electrical input signals corresponding to its mechanical movement along the axis, thereby controlling the movement of the plunger assembly 302, 305.

In some embodiments, a management application running on the computers 102 can receive input parameters to control the amount and timing of the dosing. The dosing can be mechanically implemented in the system 100 by controlling the timing, distance and movement of various subsystems. For example, among other techniques, dosing can be controlled by the timing of the movement of the revolver 116, the speed of the movement of the revolver 116 in the insertion position, the length of the displacement of the revolver 116 in the insertion position and the displacement of the plunger block 302, when the revolver 116 is in the insertion position and the dosing valve 310 is open. In some embodiments, at least two parameters can be provided to the management application. The parameters can correspond to the dosing. The parameters can include the selected dosing mass and a selected dosing distance along the length of a cigarette. The management application can use the dosing mass and dosing distance to determine a displacement movement of the plunger block 302 and the speed and displacement of the revolver 116 in the insertion position. The management application can calculate the syringe mechanism dosing value and the distance the revolver 116 travels when in the insertion position in order to achieve the selected dosing mass. Persons of ordinary skill in the art can readily envision other input parameters from which the dosing and manner of infusion of concentrate material can be controlled. Thus, the described embodiments are not limited to the example input dosing parameters described above.

Figure 5A:
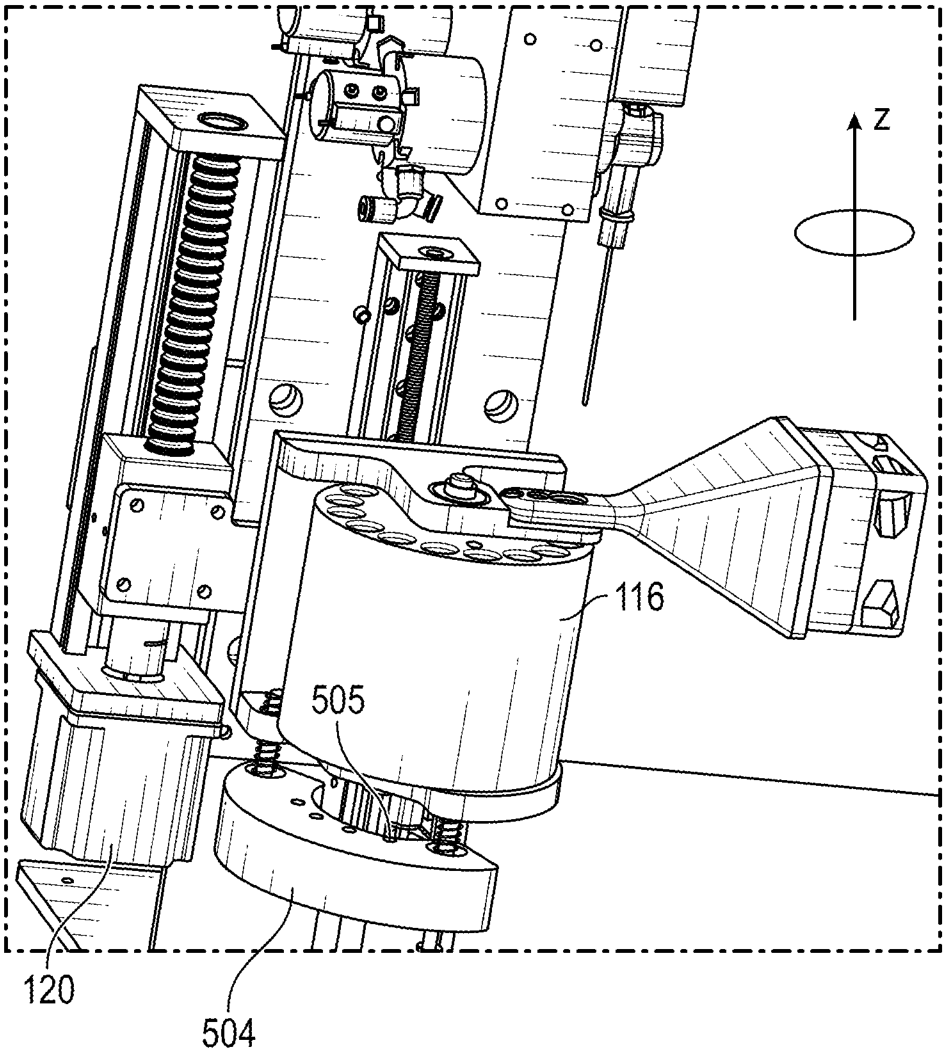
FIGS. 5A and 5B illustrate the operation of an ejector in an embodiment.
Figure 5B:
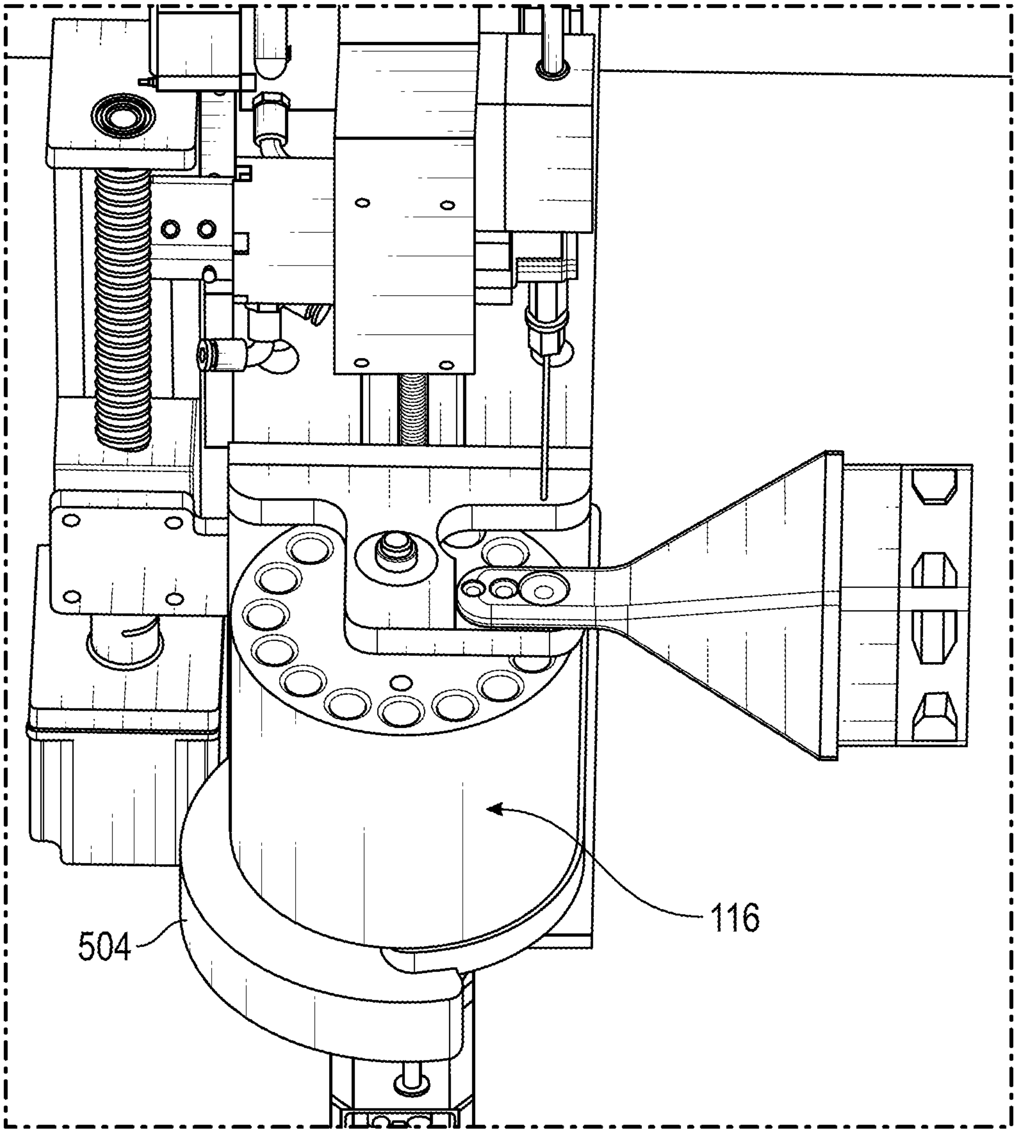

FIGS. 5A and 5B illustrate the operation of an ejector 504 in an embodiment along with additional components of the system 100. In some embodiments, an ejector 504 can be positioned or otherwise installed below the revolver 116 to eject the infused cigarettes from the cavities of the revolver 116. In one embodiment, the ejector 504 can include a plurality of pins (at locations 505) insertable into the cavities of the revolver 116, from the end opposite the canula insertion end. For clarity of illustration, the pins are not illustrated. The ejector 504 can move along the axis Z, inserting its pins into the cavities of the revolver 116 from the end opposite the canula insertion end, thereby pushing the infused cigarettes out of the cavities of the revolver 116 at the top (the canula insertion end). In some embodiments, the ejector 504 can eject 4 cigarettes at a time, other ejection numbers are also possible depending on the selected implementation. FIG. 5A illustrates the ejector 504 at rest and FIG. 5B illustrates the ejector 504 in the ejecting position, wherein its pins push the infused cigarettes out of the revolver 116. As will be described, in another embodiment, the ejector 504 is eliminated and instead, the revolver 116 can be dismounted from the baseplate 110 to be refilled on replaced with a new revolver containing uninfused cigarettes. FIG. 5A also illustrates the components of the secondary motor assembly 120, which can assist the first motor assembly 118 in transitioning the revolver 116 between the rotatable and insertion positions. The second motor assembly 120 is optional.

Figure 6:
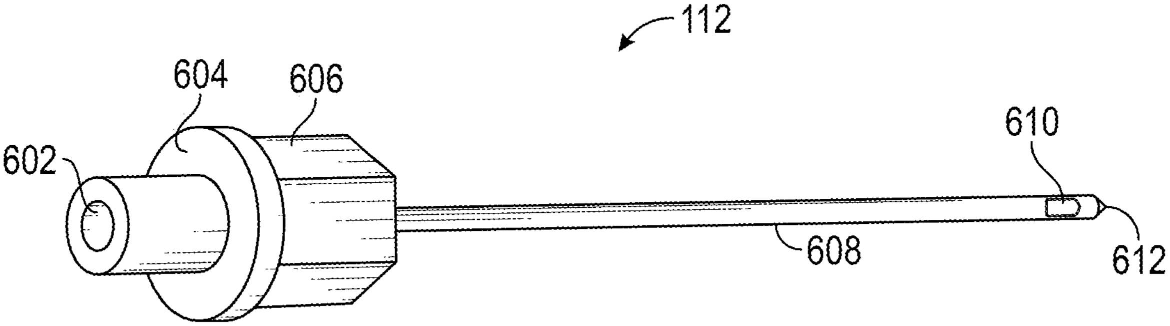
FIG. 6 illustrates a needle assembly, according to an embodiment.

FIG. 6 illustrates a needle assembly 112, according to an embodiment. The needle assembly 112 and the components therein can be made of material selected between different degrees of thermal conductivity and insulating material, or a mix of such material. In one embodiment, the needle assembly 112 connects to the dosing valve 310 (the dosing valve is illustrated in FIG. 3). The needle assembly 112 can include a threaded cylinder 602. The threads can be used to screw the needle assembly 112 to the dosing valve 310. Therefore, the dosing valve 310 can included complementary threads to allow threaded cylinder 602 to be attached to it as a screw. The cylinder 602, in one embodiment, can include an M6 thread.

The needle assembly 112 can further include a flat head 604 to allow sealing at the interface of the needle assembly 112 and the dosing valve 310. In some embodiments, the flat head 604 can have a circular cross section allowing for use of O-ring sealing at the interface of the flat head 604 and the dosing valve 310.

The needle assembly 112 can further include a screw handle 606, where the screw handle 606 and the threaded cylinder 602 flank the flat head 604. The screw head 606 allows an operator to grab the needle assembly 112 and screw the same into the dosing valve 310. The screw head 606, therefore, can have a variety of shapes and cross sections, for example, the screw head 606 can be a prism with a hexagon or other polygon cross sections. The screw head 606 can be a cylinder with knurled surface or other outside surface indentations to allow for comfortable and secure gripping action. In some embodiments, the diameter of the flat head 604 exceeds the diameter of the threaded cylinder 602 and the screw head 606 to allow for better sealing.

The needle assembly 112 can further include a hollowed canula 608 with a single side port 610 substantially near its tip 612. The tip 612 of the needle assembly 112 can be a sharp tip optimized for penetrating agricultural material, such as those found in cigarettes, without crushing them. The single side port 610 (and its location on the side of the canula 608) allows the concentrate material to flow out of the canula 608, while reducing or minimizing clogging. Clogging in this scenario can occur due to solidified concentrate material or due to particles of the material inside the cigarettes sticking to a port. In one embodiment, an example inner diameter of the canula 608 is 1.2 mm, while its outer diameter is 1.5 mm. In one embodiment, the needle assembly 112 can include a mix of thermally insulating and conducting materials. For example, in one embodiment, the cylinder 602, the flat head 604 and the screw head 606 can be made of thermally insulating material, while the canula 608 can be made of a conductive material. In other embodiments, the material of the needle assembly 112 can be selected between different degrees of conducting and/or insulating material.

The system 100 can maintain a selected temperature of the concentrate material as the concentrate material travels through various compartments, tubes, openings and channels within the system 100. For example, as described earlier, the concentrate material in the reservoir 106 can be temperature controlled. The heated tube 108 can also maintain the temperature of the concentrate material at or substantially near a selected temperature. Maintaining a selected temperature of the concentrate material can be desirable because temperatures outside a selected range can mean the concentrate material would solidify to a point where clogging can occur and injection and infusion operations become inefficient. If the concentrate material is too cold, it cannot easily traverse through an automated injection system. If the concentrate material is too hot, the desirable chemical properties of the concentrate material can be undesirably altered. Additional temperature control features in the system 100 will further be described below.

Figure 7:
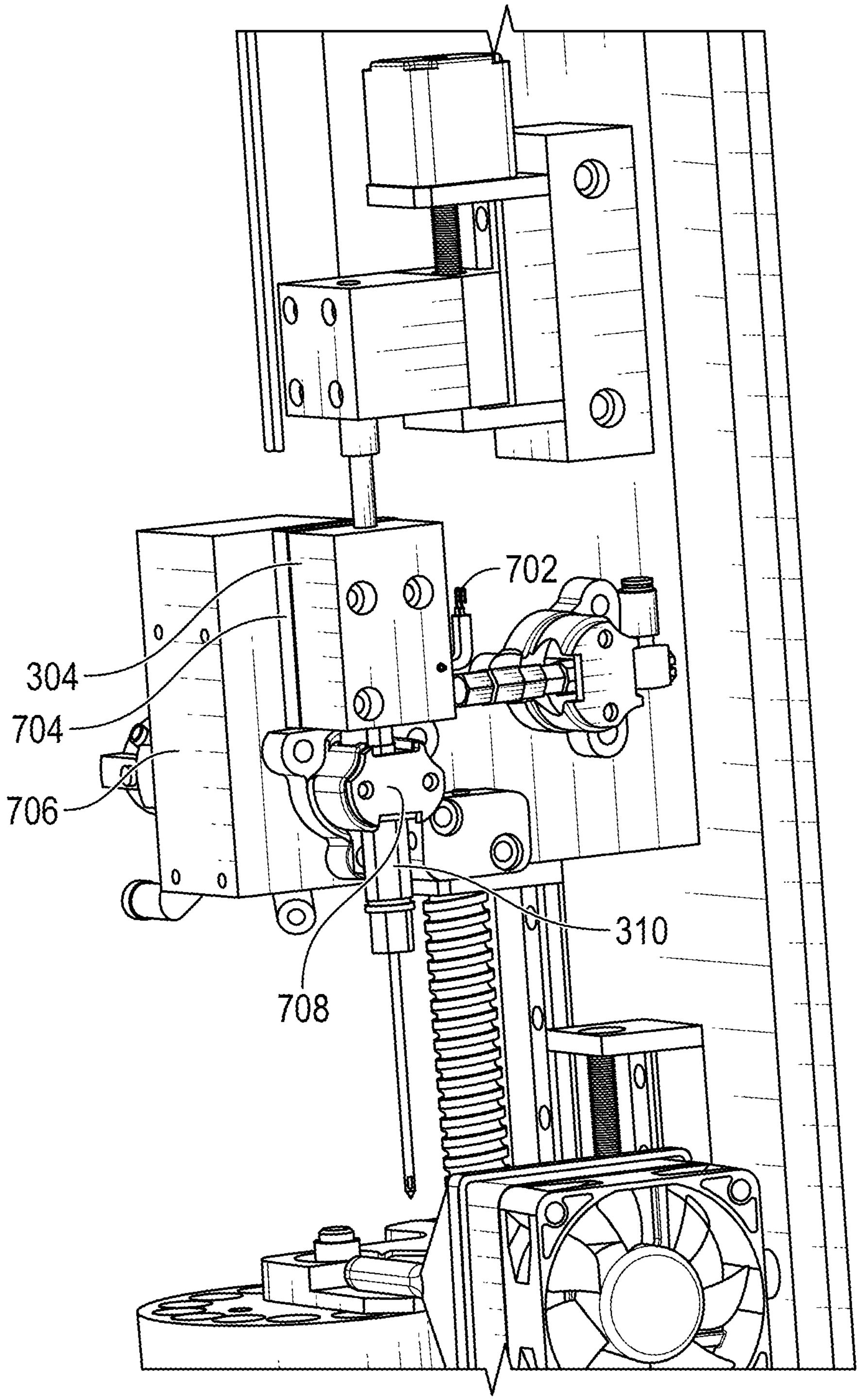
FIG. 7 illustrates additional temperature control mechanisms within an infusion system according to an embodiment.

FIG. 7 illustrates additional temperature control mechanisms within the system 100. The dosing chamber 304 can be fitted with a heater cartridge 702. The heater cartridge 702 can provide heat to the concentrate material at the dosing chamber 304. A thermal break 704 can also be included between the dosing chamber 304 and its mount 706. In some embodiments, the mount 706 can be a metal piece and the thermal break 704 can reduce or minimize the loss of temperature through the mount 706. The dosing valve 310 can also be encased in plastic yolk 708 or other heat-transfer-resistant material.

Figure 8:
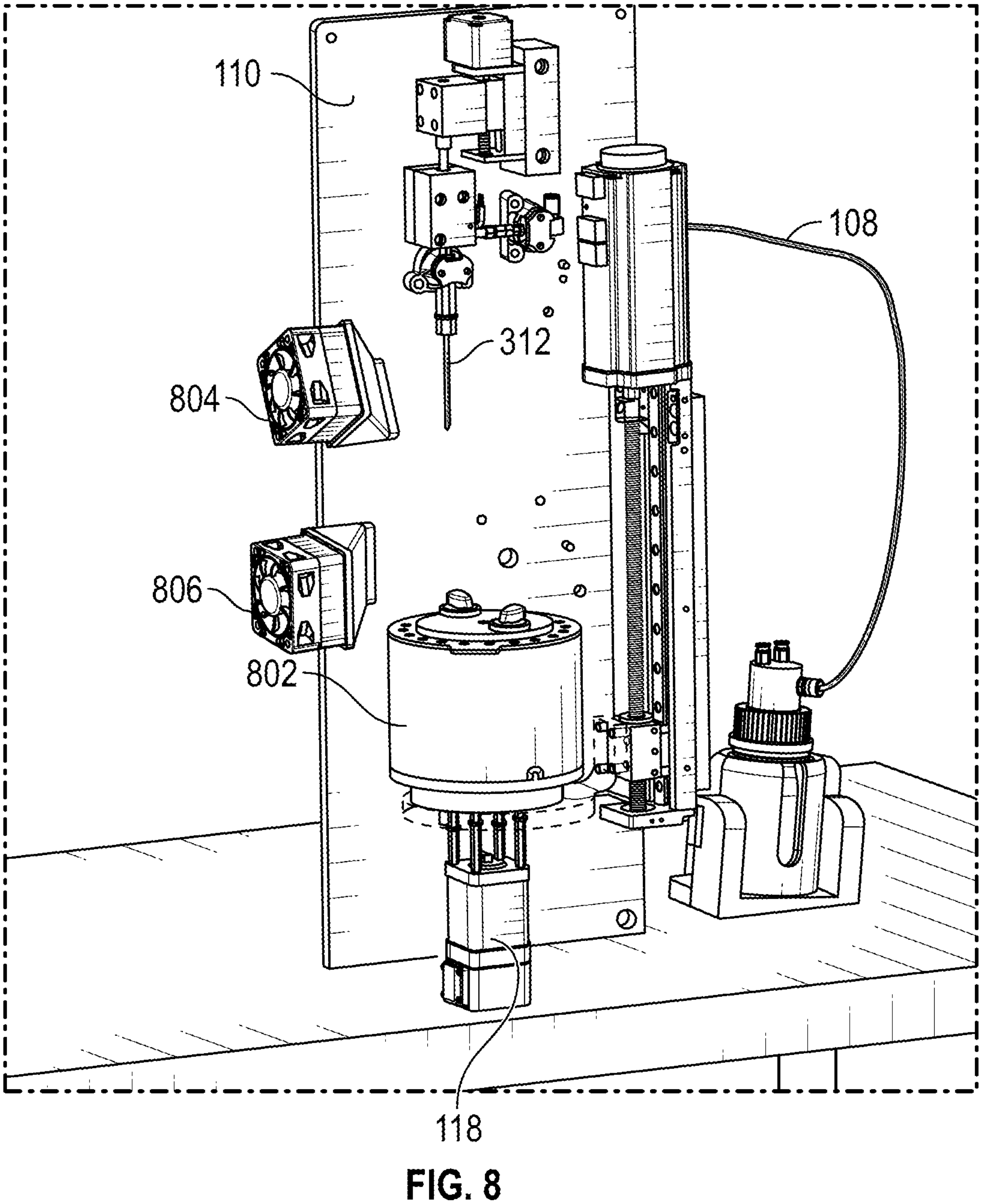
FIG. 8 illustrates an alternative embodiment of the infusion system of FIG. 1.

FIG. 8 illustrates an alternative embodiment of the system 100, where a revolver 802 is removably attached to the motor assembly 118. In this manner, one or more additional revolvers 802 can be filled with cigarettes (away from the system 100) to quickly replace a revolver 802 whose cigarettes have already been infused with the concentrate material. Removability of the revolver 802 can further increase the efficiency of the system 100. For example, an operator of the system 100 can fill additional revolvers 802 or unload a dismounted revolver 802 when the system 100 is infusing cigarettes in another revolver 802. While the reservoir 106 is shown mounted on the table 105, in some embodiments, the reservoir 106 can be mounted on the base plate 110 or otherwise placed in a position above the dosing chamber 304 and the pump assembly 302, 205, in order to utilize the force of gravity when transferring concentrate material to the dosing chamber 304. This alternative placement of the reservoir 106 can apply to the embodiments of FIG. 8 and other embodiments described herein. One or more heaters 804, 806 can be affixed on the baseplate 110 and adjacent to or near the canula 312 to help maintain the temperature of the concentrate material in the canula 312. In a preferred embodiment, one heater 804 is installed on the baseplate 110 adjacent to the canula 312. The heater 804 can be a blower-type of heater with a heating element and a fan. In some embodiments, the surface area of the output of the heater 804 can be substantially the same length as the canula 312, such that the heater 804 can provide heat along the entire length of the canula 312 or a substantial portion thereof. In an alternative embodiment, the heater output surface area can be substantially directed at the tip of the canula 312, as shown in the heater 114 in the embodiment of FIG. 3, providing heat to the tip of the canula 312 at or near the insertion time. However, the heater 114 can also be resized to provide an output surface area to blow heat at the entire length of the canula 312 or a substantial portion thereof, or it can provide heat to the canula 312 at times other than the insertion time to maintain a selected temperature at the canula 312.

The canula 312 is effectively a high-flux heat exchanger from which the temperature of the concentrate material can quickly be lost to the environment. The loss of temperature in the concentrate material can cause it to solidify and clog up the system 100. The heater fan 804 can restore or help maintain the temperature of the concentrate material in the canula 312 to a selected temperature more optimally suited for infusion. While in the embodiment of FIG. 3, the heater fan 114 is shown connected and movable with the revolver 116, it need not be so positioned in every embodiment. For example, the heater fan 804, as shown in the embodiment of FIG. 8 can be attached to the baseplate 110 and adjacent to the canula 312. Thus, the revolver 802 can be easily dismounted from the motor assembly 118.

The selected temperature of the concentrate material can depend on the type of the concentrate material, its viscosity, melting point, burn point, or other desirable temperatures parameters of the concentrate material. Some of the parameters related to a desired selected temperature can be empirically determined and/or may be subjective (e.g., those parameters relating to the taste of the infused cigarettes or the consumer feelings post consumption). An example temperature range within which a selected temperature may be chosen, in some embodiments, can be a range between 40 to 60 degrees Celsius.

Figure 9A:
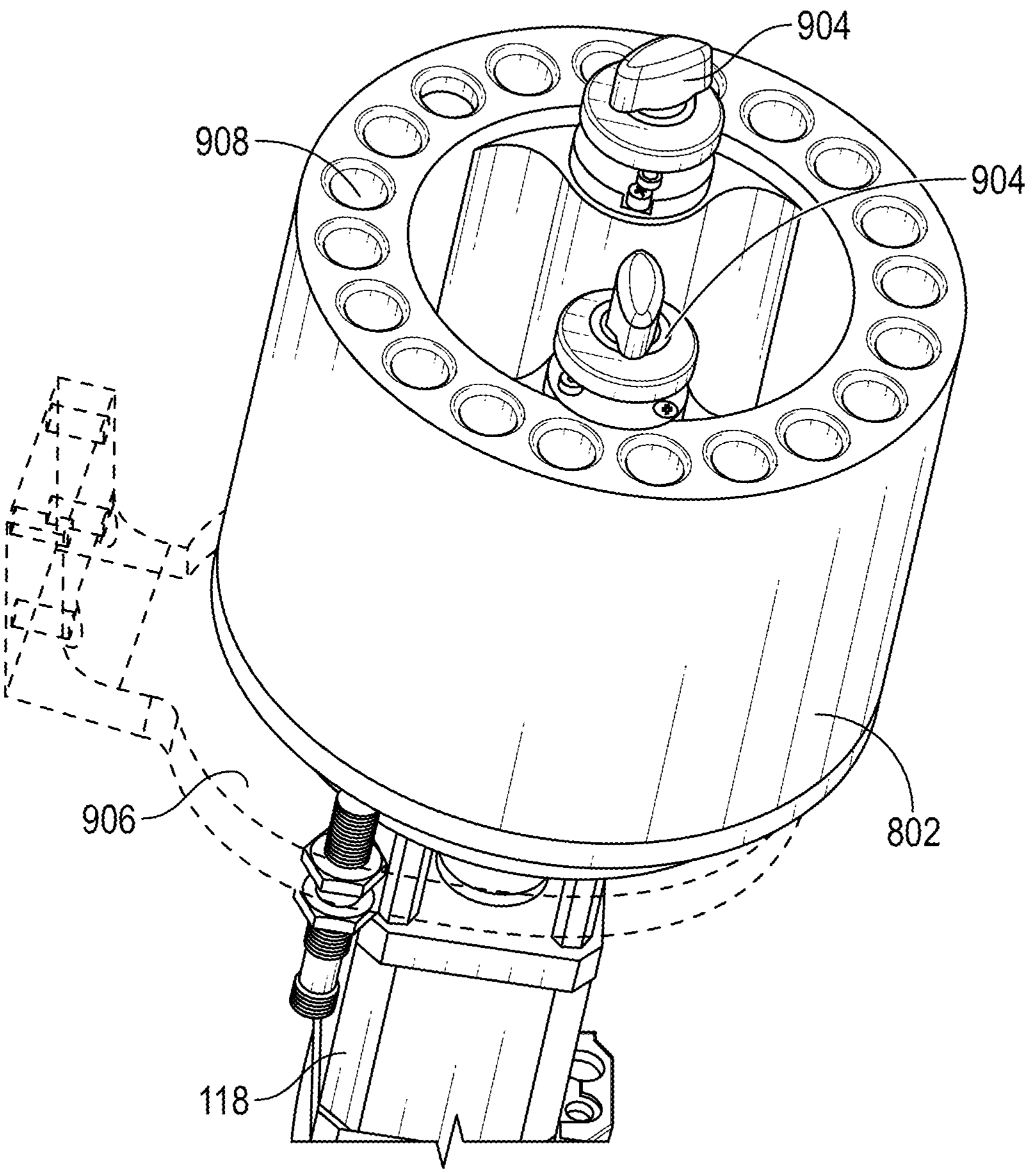
FIGS. 9A and 9B illustrate further details of an example revolver, as used in conjunction with the embodiment of FIG. 8.
Figure 9B:
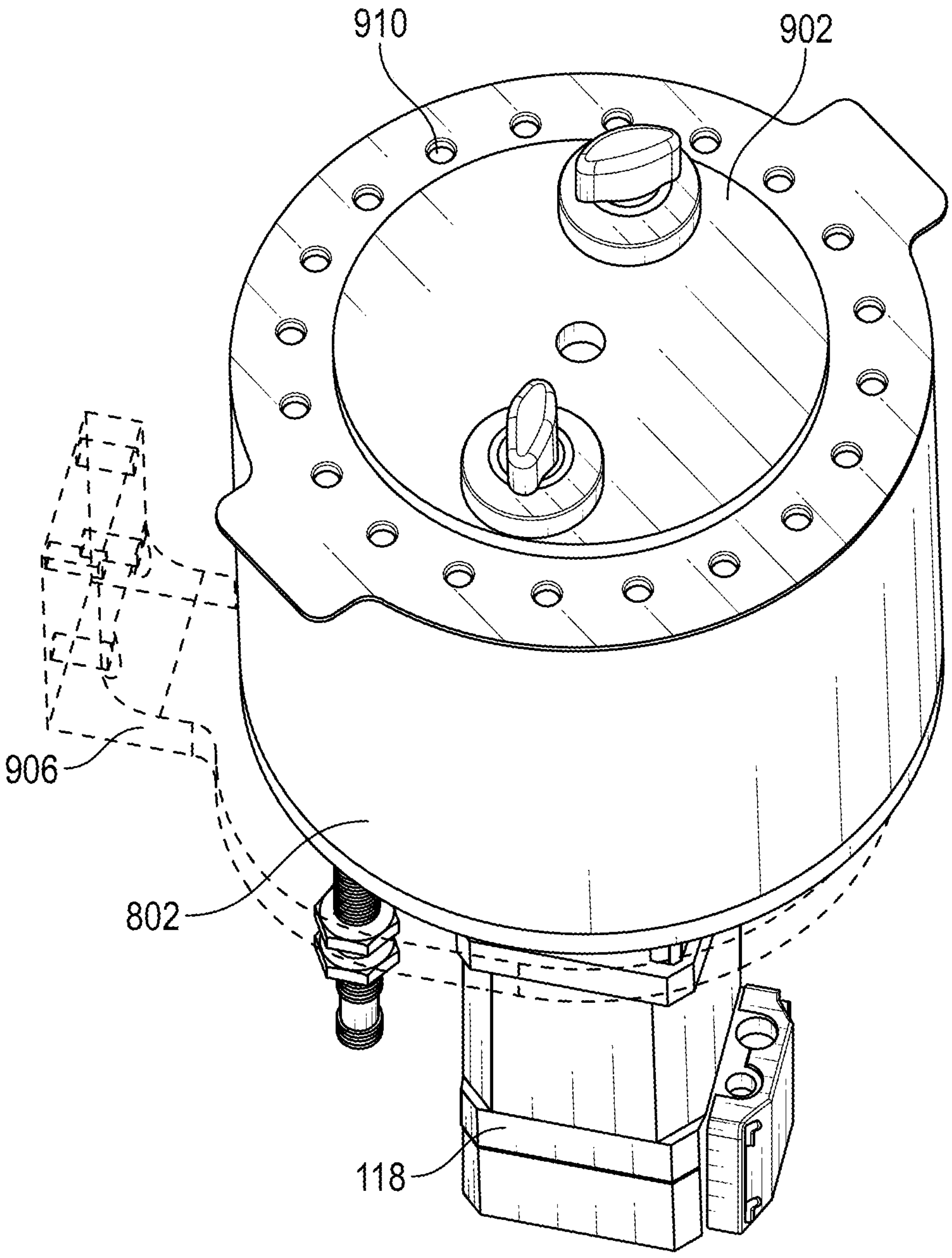

FIGS. 9A and 9B illustrate further details of an example revolver 802, as described in relation to the embodiment of FIG. 8. FIG. 9A illustrates the revolver 802 without a cap. FIG. 9B illustrates the revolver 802 with the cap 902. One or more locking mechanisms 904 can retain the cap 902 on the revolver 802. The revolver 802 is removable from the system 100 and the motor assembly 118. In some embodiments, the revolver 802 and a revolver base 906 are keyed or shaped, such that they can interlock only in one position. In addition, some embodiments can augment the keyed positions with magnets to facilitate the convenient insertion of the revolver 802 onto its revolver base 906. In the embodiment of FIGS. 8 and 9, the cigarettes can be loaded from the top (the cap 902 side). The cavities 908 of the revolver 802 can be shaped to prevent the cigarettes from falling from the bottom side (the revolver base 906 side). For example, the cavities 908 can be cone-shaped with the apex at the bottom of the revolver 802, so tapered cigarettes can be contained in the revolver between the apex of the cone-shaped cavities and the cap 902. In another embodiment, the bottom of the cavities 908 can be plugged or otherwise blocked. The cigarettes can be tapered or straight cylindrical or can have other geometrical cross sections. In some embodiments, the cavities 908 can include removable barrels to facilitate clearing, cleaning, and/or inspection.

At the top, the cap 902, includes canula insertion holes 910. The canula 312 can penetrate the cigarettes in the cavities 908 and can inject the cigarettes therein. On the way out, the revolver 802 pulls the cigarettes away from the canula 312, the cap 902 prevents the cigarettes from sticking to the canula 312 and retains them in the revolver 802. To fill the revolver 802, the cap 902 is removed by unlocking the locking mechanisms 904, and filling the cavities 908 with cigarettes. The cap 902 is placed back on the revolver 802 and locking mechanisms 904 are engaged. The revolver 802 is then placed on the revolver base 906. The revolver base 906 can include additional parts that can act as a rotating tray, which can rotate the revolver 802 during the operation of the system 100 to inject and infuse the cigarettes therein.

An advantage of the system 100 is that it can be used to automate the infusion of a variety of concentrate material. The system 100 can be configured to provide and maintain a suitable infusion temperature for a variety of concentrate material that would otherwise require a manual process for infusion. For example, previously, a variety of distillates and concentrate materials were not suitable candidates for automated infusion processes. They were typically of a shape, size, and form (at ambient temperatures) that made them impractical or unsuitable for automated infusion processes (e.g., they could be too sticky at ambient temperatures for automated infusion processes). Some of those concentrate materials can be a candidate for automated infusion processes if they could be handled in temperatures that render them fluid or in a melted state. The described embodiments enable the automated infusion processes of such concentrate materials whose infusion processes were previously not automatable or were difficult to automate.

Another advantage of the system 100 is its ability to maintain a selected temperature range for the concentrate material throughout the various compartments within the system. Ability to control this selected temperature range correlates with ability to properly dose the concentrate material in cigarettes. If the concentrate material is too hot, not only it can be degraded, but it can be difficult to dose because its flow rate can be high. If the concentrate material is too cold, it can also be difficult to dose because it can clog up and resist movement. Furthermore, various distillates and concentrate materials have varying suitable infusion temperatures at which a balance between easy traverse within an automation system and maintaining the quality of the concentrate material needs to be achieved. The system 100 can control the selected temperature ranges of a variety of the concentrate materials according to their properties and requirements.

A variety of temperature control algorithms and methods can be combined with the described embodiments to maintain a selected temperature range of the concentrate material. For example, in some embodiments, bang-bang control and/or a proportional-integral-derivative (PID) microcontroller can be used.

References to maintaining a selected temperature in the described embodiments can refer to maintaining a single temperature or a range of temperatures, depending on the sensitivities and error margins of the equipment used. Persons of ordinary skill in the art can appreciate that by using the system 100, maintaining a precise, unvarying temperature in some cases may be impractical, but maintaining a selected range of temperatures may be acceptable and achievable.

While the embodiments are described in terms of infusing cigarettes, any container selected to be infused or injected with a viscous material can be inserted in the revolver 116 and be infused or injected with a concentrate material by using the described technology.

An operating advantage of the described embodiments is that a thermally controlled material can be both pressure-fed into a dosing chamber at a first stage and pump-injected at a second stage, wherein the first and second stage operations work in concert to provide a selected dosing. The transfer of thixotropic fluids can be improved by using a shearing force. The pump stage provides that shearing force, as well as a selected geometry upon which the amount of dosed material can be controlled. This two-stage approach suits the transfer and handling of viscous concentrate material. In other contexts, for example, molten glue, the material can be delivered to a container, with precision, via a pressurized feed line and a valve that cycles open and shut, dripping the material into a container. Such single stage approaches work better in the context of transfer of materials that are not thixotropic (e.g., glue), but are less effective in the context of thixotropic and viscous material, as is the case for some concentrate materials and distillates, which are better transferred and dosed via a shearing force.

For some thixotropic materials, a single-stage pressure-fed line for material delivery may be adequate if heating the material to a high temperature, without degradation is an option. In the case of concentrate material, an automation system may not have the option of high temperatures because the material is sensitive and can substantially degrade at high temperatures. As a result, infusion automation systems may have to be designed for the minimum operating temperatures, at which the concentrate material is also the most difficult to transfer and dose. The two-stage techniques described above allow proper transfer and dosing of the concentrate material at lower temperatures, thus maintaining the quality of the infused concentrate material and the end product. As an additional feature, in some embodiments, a stirrer in the reservoir jar 200 can further assist with maintaining a selected temperature and reduce the amount of heat that would have to be provided to the concentrate material to maintain a uniform selected temperature.

Furthermore, maintaining a selected temperature and providing a selected dosing in the context of some concentrate material can be critical because the concentrate material can be expensive. An infusion automation system only makes sense if it can provide the selected ranges with an acceptable degree of precision. Otherwise, manual infusion operations are preferred to prevent waste. The described embodiments, provide the selected temperature ranges and selected dosages within a degree of precision that make their operations economically preferred over existing approaches.

While the embodiments are described using one injection canula, the operating principles of the embodiments are not so limited and can be extended to two or more cannulas and/or needle assemblies to increase the efficiency of the infusion.

In some embodiments, the needle assembly and/or the canula can be placed under a protective cage or shroud that can prevent accidents. Other safety mechanisms as are known by persons of ordinary skill in art can be combined with the described embodiments to prevent accidents and injuries.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A thermally-controlled concentrate infusion apparatus comprising:

a thermally controlled and pressurized reservoir of concentrate material configured to apply a first amount of pressure, comprising a feed pressure, to the concentrate material, and further configured to maintain a selected temperature of the concentrate material;

a heated tube coupling the reservoir to a dosing chamber, wherein the first amount of pressure in the reservoir feeds the concentrate material into the dosing chamber via the heated tube;

a pump assembly configured to exert a second amount of pressure, comprising dosing pressure, to the concentrate material in the dosing chamber feeding the concentrate material to a needle assembly;

a revolver, rotatable about an axis and comprising a plurality of hollowed cavities, each cavity shaped to house a cigarette; and a motor assembly configured to move the revolver laterally along the axis between a rotatable position and an insertion position, wherein in the insertion position, a canula of the needle assembly penetrates a cigarette housed in a cavity of the revolver.

2. The apparatus of claim 1, wherein each cavity of the revolver is shaped to house a single cigarette.

3. The apparatus of claim 1, wherein the canula is configured to inject the concentrate material into the cigarette while the canula penetrates the cigarette.

4. The apparatus of claim 1, wherein the revolver is rotatable while in the rotatable position and is not rotatable while in the insertion position.

5. An infusion system, comprising:

a reservoir configured to hold an infusion material;

a first heater configured to heat the infusion material;

a holder having multiple cylindrical cavities, each of the multiple cylindrical cavities being aligned in the same direction and configured to hold a single cylindrical object therein, wherein the holder is configured to be moved between a first position and a second position in the same direction as the alignment of the multiple cylindrical cavities; and a cannula having a port, the cannula being arranged to be outside of all of the multiple cylindrical cavities when the holder is at the first position and inside one of the multiple cylindrical cavities when the holder is at the second position, wherein the cannula is configured to infuse the heated infusion material through the port and into a separate cylindrical object held within one of the multiple cylindrical cavities when the holder is at the second position;

wherein each of the multiple cylindrical cavities is configured to hold a single cigarette therein simultaneously; and wherein the holder is further configured:

to be moved from the first position to the second position for the heated infusion material to be infused into a single cigarette held within a first cavity of the multiple cylindrical cavities, to be moved from the second position back to the first position, to be reoriented while at the first position to align a second cavity of the multiple cylindrical cavities with the cannula, and to be moved from the first position to the second position for the heated infusion material to be infused into a single cigarette held within the second cavity of the multiple cylindrical cavities.

6. The infusion system of claim 5, wherein the separate cylindrical object is a cigarette.

7. The infusion system of claim 5, wherein the cannula is configured to remain stationary while the holder is moved between the first and second positions.

8. The infusion system of claim 5, further comprising:

a second heater configured to heat the cannula.

9. The infusion system of claim 8, wherein the second heater is configured to heat the infusion material to reduce the viscosity of the infusion material such that the heated infusion material is able pass through the cannula port.

10. The infusion system of claim 5, wherein the holder is further configured to be rotated to different rotational orientations while the holder is at the first position.

11. The infusion system of claim 10, wherein each of the different rotational orientations results in one of the multiple cylindrical cavities being aligned with the cannula.

12. The infusion system of claim 5, further comprising:
a motor assembly configured to move the holder between the first and second positions.

13. The infusion system of claim 5, further comprising:
a dosing chamber configured to receive the heated infusion material from the reservoir and to provide a dosage of the heated infusion material into the cannula.

14. The infusion system of claim 5, wherein reorienting the holder involves rotating the holder about a central axis thereof.

15. A method of infusing cigarettes with an infusion material, the method comprising:
holding multiple cigarettes within a holder having multiple cylindrical cavities, each of the multiple cylindrical cavities being aligned in the same direction and configured to hold a single cigarette therein;
heating an infusion material;
delivering the heated infusion material into a cannula;
moving the holder from a first position to a second position in the same direction as the alignment of the multiple cylindrical cavities, wherein the moving results in a first cigarette held in a first cavity of the multiple cylindrical cavities being forced onto the cannula such that the cannula is inside the first cigarette; and
infusing the heated infusion material through a port in the cannula and into the first cigarette while the cannula is inside the first cigarette.

16. The method of claim 15, further comprising the steps of:
moving the holder from the second position to the first position after the heated infusion material has been infused into the first cigarette;
reorienting the holder while the holder is at the first position to align a second cavity of the multiple cylindrical cavities with the cannula;
moving the holder from the first position to the second position, wherein the moving results in a second cigarette held in the second cavity being forced onto the cannula such that the cannula is inside the second cigarette; and
infusing the heated infusion material through the port in the cannula and into the second cigarette while the cannula is inside the second cigarette.

17. The method of claim 16, wherein reorienting the holder involves rotating the holder about a central axis thereof.

18. The method of claim 16, further comprising the step of:
ejecting the first and second infused cigarettes from the holder while one or more additional cigarettes remain within the holder.

* * * * *